(12) United States Patent
Griffin et al.

(10) Patent No.: US 7,720,159 B2
(45) Date of Patent: *May 18, 2010

(54) RECEIVERS FOR CYCLE ENCODED SIGNALS

(75) Inventors: Jed D. Griffin, Forest Grove, OR (US); Jerry G Jex, Olympia, WA (US); Arnaud J. Forestier, Irvine, CA (US); Kersi H. Vakil, Olympia, WA (US); Abhimanyu Kolla, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/925,474

(22) Filed: Oct. 26, 2007

(65) Prior Publication Data

US 2008/0101505 A1    May 1, 2008

Related U.S. Application Data

(63) Continuation of application No. 10/625,944, filed on Jul. 23, 2003, now Pat. No. 7,305,023.

(51) Int. Cl.
*H04B 14/06* (2006.01)
*H04B 14/04* (2006.01)
*H04L 7/06* (2006.01)
(52) U.S. Cl. .................. 375/244; 375/242; 375/364
(58) Field of Classification Search ............. 375/219, 375/241, 242, 244, 257, 295, 316, 354, 362, 375/364
See application file for complete search history.

(56) References Cited

U.S. PATENT DOCUMENTS

| 3,665,474 | A |   | 5/1972  | Thayer         |         |
|-----------|---|---|---------|----------------|---------|
| 4,128,828 | A |   | 12/1978 | Samejima et al.|         |
| 4,379,284 | A |   | 4/1983  | Boykin         |         |
| 4,435,824 | A | * | 3/1984  | Dellande et al.| 375/273 |
| 4,569,017 | A |   | 2/1986  | Renner et al.  |         |

(Continued)

FOREIGN PATENT DOCUMENTS

EP    0 110 427    6/1984

(Continued)

OTHER PUBLICATIONS

Couch—Digital and Analog Communication Systems pp. 160-169, 337-352, and 467-495, Prentice Hall, 2001, 1997.

(Continued)

*Primary Examiner*—Young T. Tse
(74) *Attorney, Agent, or Firm*—Caven & Aghevli LLC

(57) ABSTRACT

In some embodiments, the inventions includes a transmitter including a cycle encoding circuit to receive a data input signal and to provide a full cycle encoded signal in response thereto by continuously joining portions of different encoding signals. Some of the encoding signals have a different frequency than others of the encoding signals and some of the encoding signals have a different phase than others of the encoding signals. Data is represented in data time segments of the full cycle encoded signal and no data time segment has more than one cycle of an encoding signal. In some embodiments, a receiver receives the cycle encoded signal and recovers data of the data input signal.

19 Claims, 12 Drawing Sheets

U.S. PATENT DOCUMENTS

| | | | |
|---|---|---|---|
| 4,583,048 | A | 4/1986 | Gumacos et al. |
| 4,663,767 | A | 5/1987 | Bodlaj et al. |
| 4,849,706 | A | 7/1989 | Davis et al. |
| 4,922,206 | A | 5/1990 | Nicholas |
| 5,056,122 | A | 10/1991 | Price |
| 5,103,463 | A | 4/1992 | Schoeneberg |
| 5,168,511 | A | 12/1992 | Boles |
| 5,317,597 | A | 5/1994 | Eisele |
| 5,347,543 | A | 9/1994 | Lecoco et al. |
| 5,491,434 | A | 2/1996 | Harnishfeger et al. |
| 5,623,518 | A | 4/1997 | Pfiffner |
| 5,742,135 | A * | 4/1998 | Horst .................. 375/354 |
| 5,821,779 | A | 10/1998 | Martwick |
| 5,862,180 | A | 1/1999 | Heinz |
| 5,898,735 | A | 4/1999 | Yamauchi |
| 6,137,827 | A | 10/2000 | Scott et al. |
| 6,154,498 | A | 11/2000 | Dabral et al. |
| 6,396,877 | B1 * | 5/2002 | Hollenbach et al. ......... 375/247 |
| 7,305,023 | B2 | 12/2007 | Griffin et al. |
| 7,308,025 | B2 | 12/2007 | Jex et al. |
| 2001/0006538 | A1 | 7/2001 | Simon et al. |

FOREIGN PATENT DOCUMENTS

| | | |
|---|---|---|
| EP | 0 325 005 | 1/1988 |
| EP | 0 917 324 | 5/1999 |
| JP | 61-080933 | 4/1986 |

OTHER PUBLICATIONS

P17324 PCT Search Report and Written Opinion.
United States Patent Application, pending—not yet published, U.S. Appl. No. 11/925,462, filed Oct. 26, 2007, to Jex et al.
Sanyal, S.K. et al. "A Novel Microprocessor-Controlled Active-R Multifunction Network: Design of Programmable Filter, Oscillator, and FSK/PSK Wave Generator"0 IEEE Transactions on Circuits and Systems, vol. 37, No. 9, Sep. 1990, pp. 1085-1091.
Office Action received for EP Patent Application No. 04756759.9-1237 dated Mar. 13, 2009, 8 pages.
Office Action for Chinese Application No. 200480021320.X, mailed Mar. 27, 2009, 16 pages, inclusive of English translation.
Office Action for Chinese Application No. 200480021224.X, mailed Nov. 7, 2008, 19 pages, inclusive of English translation.
Office Action for Chinese Application No. 200480021224.X, mailed Jun. 26, 2009, 9 pages, inclusive of English translation.
International Search Report and Written Opinion for International Application No. PCT/US2004/021799, mailed on Nov. 15, 2004, 12 pages.
International Preliminary Report on Patentability received for PCT Application No. PCT/US2004/021799 mailed on Jan. 23, 2006, 7 pages.
International Preliminary Report on Patentability received for PCT Patent Application No. PCT/US2004/021806, mailed on Feb. 2, 2006, 8 pages.
Office Action for EP Patent Application No. 04777713.1-1237, mailed on Aug. 5, 2008, 4 pages.
Office Action for EP Patent Application No. 04777713.1-1237, mailed on Jul. 12, 2006, 6 pages.
Office Action for Japanese Patent Application No. 2006-521097, mailed on May 12, 2009, 9 pages inclusive of English translation.
Office Action for Singapore Patent Application No. 0600306-5, mailed on Feb. 24, 2009, 5 pages.
Written Opinion for Singapore Patent Application No. 0600306-5, mailed on May 15, 2008, 7 pages.
Office Action for U.S. Appl. No. 10/625,945 mailed on Dec. 29, 2006, 13 pages.
Office Action received for U.S. Appl. No. 10/625,945 mailed on Mar. 30, 2007, 11 pages.
Office Action for U.S. Appl. No. 10/625,944, mailed on Dec. 29, 2006, 10 pages.
Office Action for U.S. Appl. No. 10/625,944, mailed on Mar. 30, 2007, 12 pages.

* cited by examiner

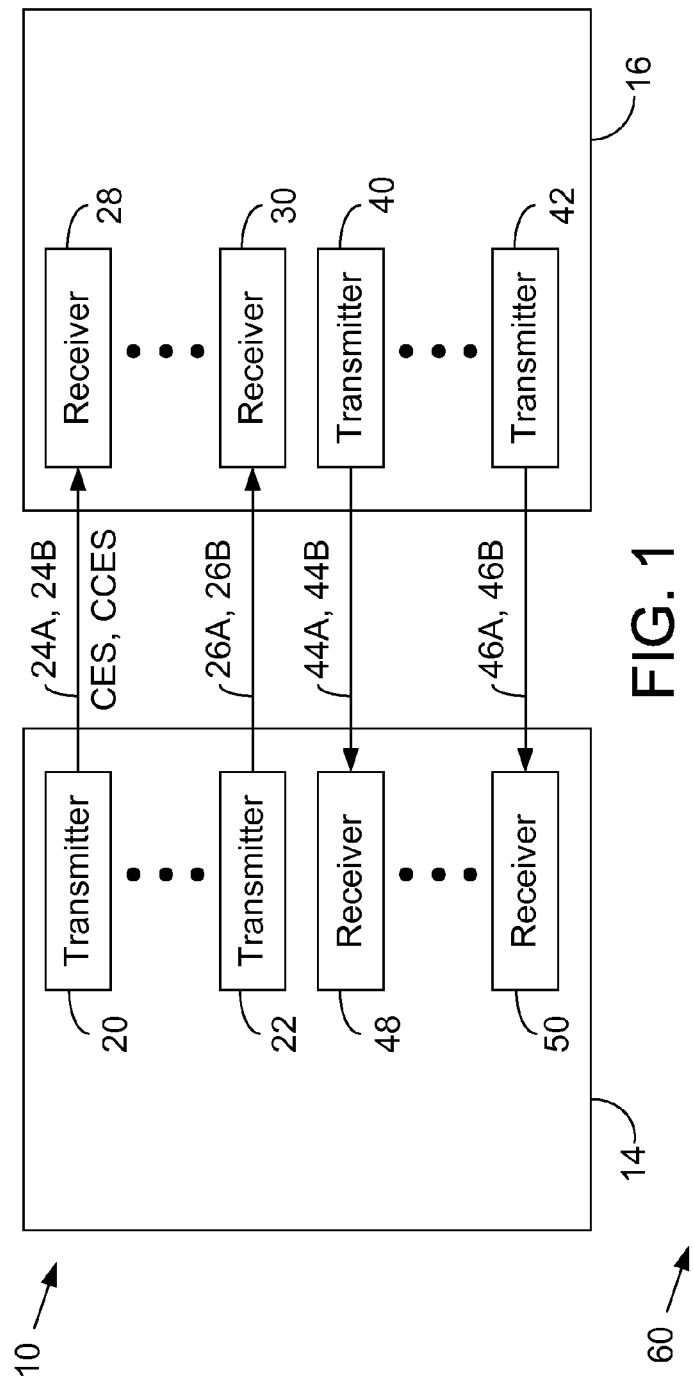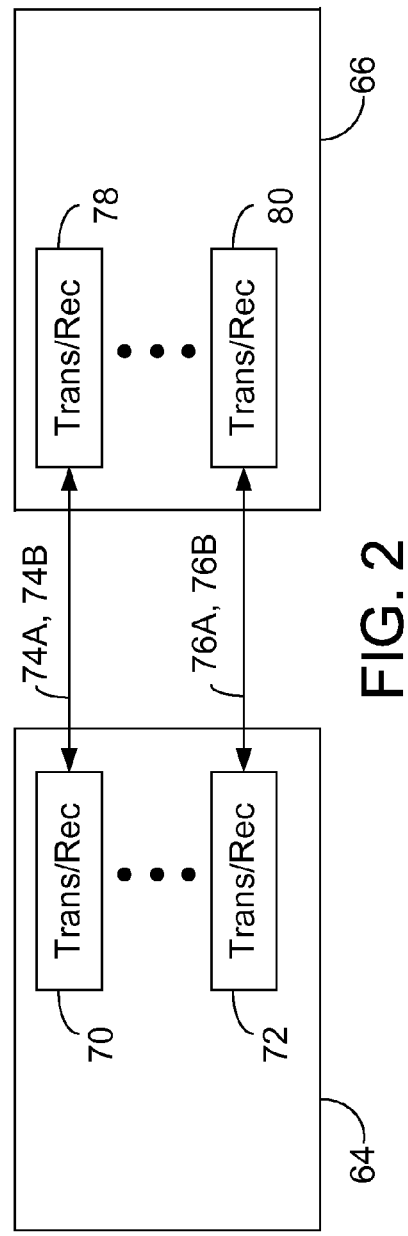

US 7,720,159 B2

RECEIVERS FOR CYCLE ENCODED SIGNALS

RELATED APPLICATION

This application is a continuation of application Ser. No. 10/625,944, filed Jul. 23, 2003 (now U.S. Pat. No. 7,305,023). Further, parent application Ser. No. 10/625,944 and application Ser. No. 10/625,945 entitled "Transmitters providing cycle encoded signals" were filed on Jul. 23, 2003, have identical specifications (except for titles, technical field description, claims, and abstract), and claim related subject matter. A continuation of application Ser. No. 10/625,945 (now U.S. Pat. No. 7,308,025) was also filed on Oct. 26, 2007 and received application Ser. No. 11/925,462.

BACKGROUND OF THE INVENTION

1. Technical Field of the Inventions

The inventions relate to receivers for cycle encoded signals and to related systems.

2. Background Art

Inter symbol interference (ISI) degrades signal integrity through superimposition of pulses at varying frequencies. Data patterns with high frequency pulses are susceptible to ISI. Higher frequency pulses may phase shift more and attenuate more relative to lower frequency pulses leading to loss of the higher frequency pulses when superimposed with lower frequency pulses. The distortion to data patterns caused by ISI may lead to errors. The frequency at which uncompensated random data patterns in conventional signaling can be transmitted may be limited by ISI.

Equalization and Nyquist signaling are two solutions to ISI that have been proposed. Equalization is a curve-fitting solution that attempts to restore amplitude for higher frequency pulses in susceptible data patterns. It seeks to anticipate lost data and restore it through pre-emphasizing the amplitude on narrow pulses. Disadvantages of equalization include that it is at best a curve fitting solution, tweaking the amplitude of higher frequency pulses in random pulses of data to restore any anticipated loss in amplitude. The anticipated loss is very system specific and pattern specific, thus requiring tuning for predicted data patterns and for each custom system it is used in. It is susceptible to unpredicted data patterns and varying system transfer functions. The iterative nature of such solutions results in time-consuming and system-specific implementations, possibly never converging to optimal solutions.

Nyquist signaling is another prior art solution for ISI, which uses a raised cosine or sinc function pulses in the time domain to overcome ISI. The complexity to implement such functions is prohibitive in practice.

In Manchester encoding, the signal includes discontinuities at a bit cell boundary which may lead to high ISI. Some Frequency Shift Keying (FSK) encoding schemes avoid discontinuities at bit cell boundaries but FSK takes multiple cycles to represent a 0 or 1 data value.

In source synchronous signaling, data signals and one or more associated clock or strobe signals are sent from a transmitter to a receiver. The clock or strobe signal is used by the receiving circuit to determine times to sample the data signals.

In some signaling techniques, timing information can be embedded into the transmitted data signal and recovered through a state machine. An interpolator receives a number of clock or strobe signals from, for example, a phase locked loop or a delayed locked loop. The recovered timing is used to select among or between the clock or strobe signals received by the interpolator and provide the selected clock or strobe signal to a receiver to control sampling of the incoming data signal. In some implementations, training information is provided in the data signal to get the proper sample timing before actual data is transmitted. The training information can be provided from time to time to keep the sample timing. In other implementations, training information is not used, but the sample timing is created from the data signals of prior time. There are various techniques for embedding timing information. The 8B/10B technique is a well known technique.

The transmission of signals may be in a multi-drop (one transmitter to multiple receivers) or point-to-point (one transmitter to one receiver) environment. The transmission may be uni-directional, sequential bi-direction, or simultaneous bi-directional.

Different voltage levels rather than merely just low and high have been used to represent more values than merely just 0 and 1.

Noise on signals on conductors may cause the signals to be corrupted. A technique to reduce the effect of noise is to transmit the data on two wires and then reject the noise in the receiver by looking at the difference between the received signals rather than the absolute values. Typically, one conductor carries a signal that is the inverse of the other conductor.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described and shown, but are for explanation and understanding only.

FIGS. 1 and 2 are each a block diagram representation of a system according to some embodiments of the inventions.

DETAILED DESCRIPTION

A. Overview

Figure 3:
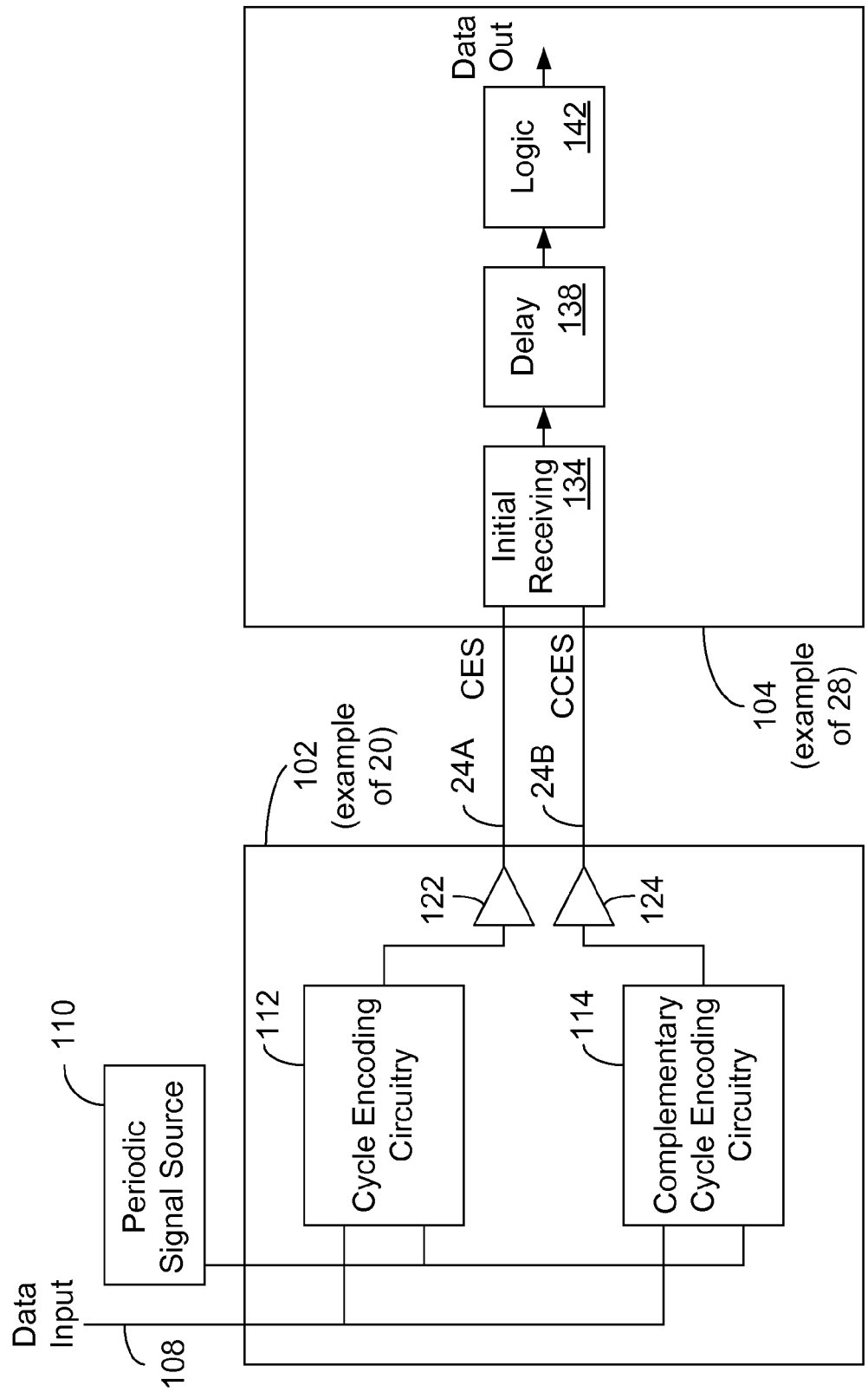
FIG. 3 is a block diagram representation of a system including a transmitter and receiver in FIG. 1 according to some embodiments of the inventions.

The inventions described herein include a system having a transmitter that encodes a data signal into a cycle encoded signal (CES). A CES is made of portions of different periodic encoding signals which are continuously joined, wherein data is represented by the encoding signals in data time segments of the cycle encoded signal. Some of the encoding signals have a different frequency and/or phase than others of the encoding signals. In a CES, at least some of the data time segments do not include more than one cycle of a particular encoding signal. In a full CES, no data time segment has more than one cycle of an encoding signal. In a partial CES, some data time segments have more than one cycle of an encoding signal, and other data time segments do not have more than one cycle of an encoding signal. The CES's described in connection with FIGS. 4, 5, 7, 10, 11, 12, and 13 are full CES's. In the CES's described in connection with FIGS. 4, 5, 7, 10, 11, 12, and 13, there is only one encoding signal per data time segment. In other embodiments, one encoding signal may be used in part of a data time segment, while another encoding signal may be used in the remainder of the data time segment.

In some embodiments, a complementary cycle encoded signal (CCES) is also created. The inventions also include receivers to receive the CES, and in some embodiments the CCES, and recover the data or, in some embodiments, an inverse of it.

The use of specific frequencies (F, F/2, etc.) rather than many, perhaps random, low and high frequency signals can reduce or eliminate ISI. The CES and CCES are referred to as controlled frequency signals because they involve a limited number of frequencies rather than a multitude of frequencies.

Referring to FIG. 1, a system 10 includes a chip or portion of a chip 14 and a chip or portion of a chip 16. In the case in which 14 and 16 represent portions of chips, they may be in the same chip. Transmitters 20 . . . 22 represent N transmitters, conductors 24A, 24B . . . 26A, 26B represent N sets of two conductors, and receivers 28 . . . 30 represent N receivers. Transmitters 20 . . . 22 provide CES's and CCES's on conductors 24A, 24B . . . 26A, 26B to receivers 28 . . . 30. Transmitters 40 . . . 42 represent M transmitters, conductors 44A, 44B . . . 46A, 46B represent M sets of two conductors, and receivers 48 . . . 50 represent M receivers. M may be the same number as N or a different number. Transmitters 40 . . . 42 provide CES and CCES on conductors 44A, 44B . . . 46A, 46B to receivers 48 . . . 50. Transmitters and receivers may be treated in groups of pairs of transmitters and receivers.

In FIG. 1, conductors 24A, 24B . . . 26A, 26B, and 44A, 44B . . . 46A, 46B are shown as transmitting signals in a single direction. Alternatively, bi-directional conductors may be used. For example, in FIG. 2, a system 60 includes a chip or portion of a chip 64 and a chip or a portion of a chip 66 in which transmitter/receivers 70 . . . 72 are coupled to transmitter/receivers 78 . . . 80 through bi-directional conductors 74A, 74B . . . 76A, 76B. The transmission may be sequential bi-directional or simultaneous bi-directional.

The CES may be used in connection with various encoding techniques such as 8b/10b encoding. The data transmitted in a CES is not limited to a particular content or meaning. Accordingly, the data of the CES might convey commands, addressing information, and traditional data. Two or three of these types of content (commands, address, and traditional data) could be time multiplexed or packetized. Alternatively, CES carrying these three types of content could be kept separate on different conductors. It could be that one or two of these types of content are conveyed through the CES, while others of the types of content are conveyed through other types of signaling. It is not necessary that the CES be used in a system that includes addressing.

Although the inventions described herein refer to transmission of data in a CES and perhaps a CCES. That does not exclude other signals that are not a CES or CCES being passed at other times over the conductors of FIGS. 1 and 2. For example, there could be some commands that are not a CES or CCES that pass over conductors that at other times carry a CES or CCES. Examples of other signals include the voltage being held constant; the lines being put in a high impedance mode; different voltages than are used in CES or CCES; some lower or higher frequency signals, etc.

B. Transmitter and Receiver of FIG. 3

FIG. 3 illustrates a transmitter 102 and a receiver 104, which are examples of transmitter 20 and receiver 28 in FIG. 1. Referring to FIG. 3, a periodic reference signal source 110 provides a periodic reference signal, such as a clock or strobe signal. Periodic signal source 110 may be created through various circuits including a phase locked loop (PPL), a delay locked loop (DLL), and a crystal oscillator. In some embodiments, the periodic reference signal has a particular phase relationship with the data input signal received by transmitter 102 on conductor(s) 108. The data input signal may be single ended or differential. In some embodiments, the periodic reference signal is in phase with the data bits of the data input signal while in other embodiments they are not in phase. The period of the reference signal may be the same as the time length of a data bit cell of the data input signal or it may be different (for example, half as great or twice as great) than the length of the data bit cell.

Transmitter 102 includes a cycle encoding circuit 112 and a complementary cycle encoding circuit 114, each of which receive the data input signal and the periodic reference signal and encode the data input signal into the CES and CCES. The CES and CCES are driven by drivers 122 and 124 to interconnects 24A and 24B, respectively, and receiver 104.

An initial receiving circuit 134 receives the CES and CCES and provides at least one signal to delay circuit 138 in response thereto. Logic circuit 142 determines the value of the data input signal that was encoded as the CES and CCES in response to at least one delayed signal. The data output (data out) signal may be identical to the data input signal or have a known relationship to the input signal. For example, the data out signal may be in the inverse of the data input signal. Of course, there are other ways in which to determine the represented value of the CES and CCES.

C. Transmitters, Receivers, and Synchronizer Circuits of FIGS. 4-9

1. Transmitter of FIGS. 4-6.

Figure 4:
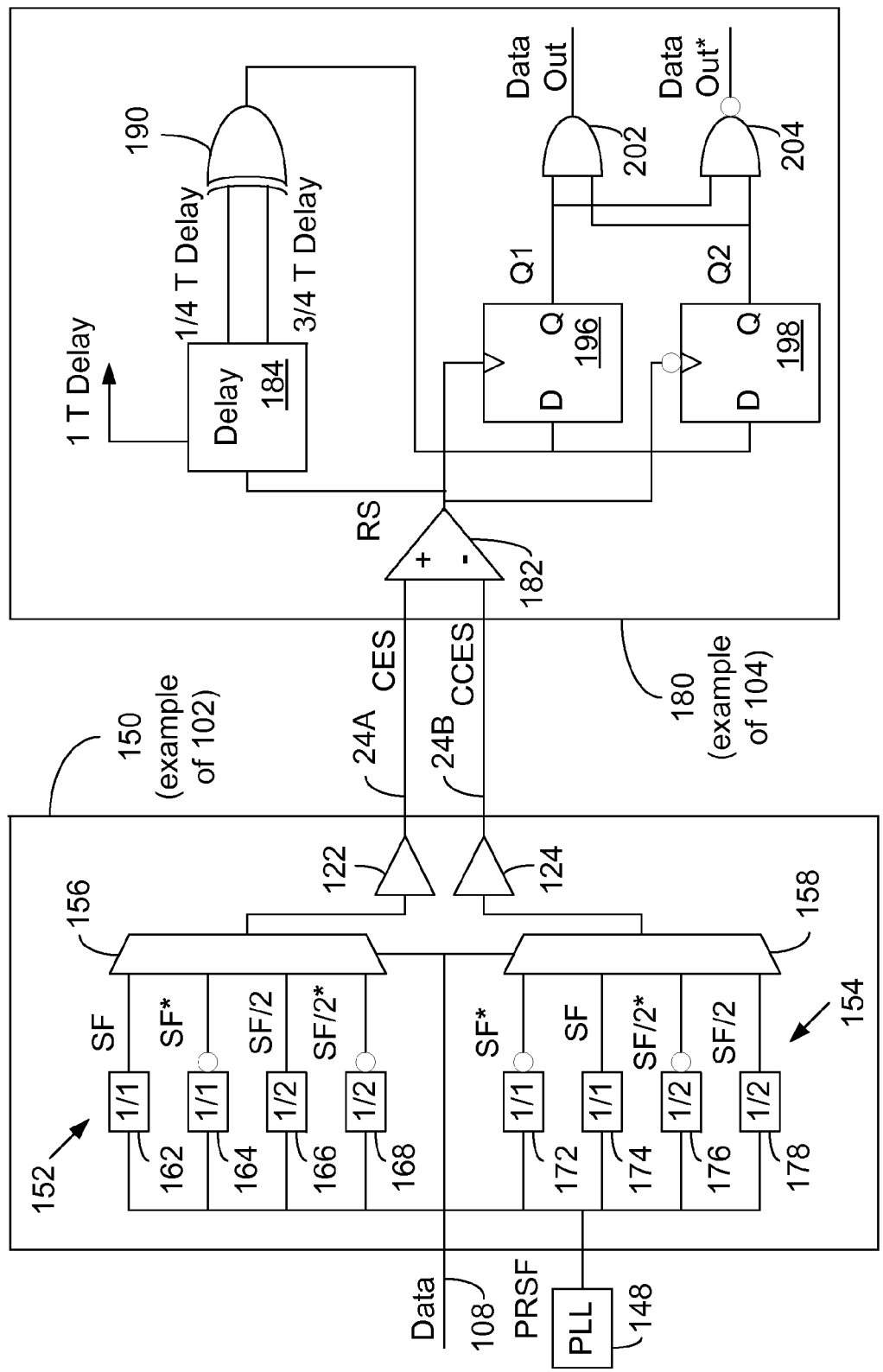
FIG. 4 is a block diagram representation of a system including examples of the transmitter and receiver of FIG. 3 according to some embodiments of the inventions.

FIG. 4 illustrates a transmitter 150 and a receiver 180, which are examples of transmitter 102 and receiver 104 in FIG. 3. Referring to FIG. 4, a PLL 148 provides a periodic reference signal PRSF with frequency F, where PLL 148 is an example of periodic signal source 110 in FIG. 3. The PRSF may be sinusoidal or non-sinusoidal. A cycle encoding circuit 152 and a complementary cycle encoding circuit 154 are examples of cycle encoding circuits 112 and 114 in FIG. 3. Cycle encoding circuit 152 includes delay circuit 162, delay and invert circuit 164, delay and divide circuit 166, and delay, divide, and invert circuit 168, and a multiplexer (MUX) 156. Circuits 162-168 provide encoding signals SF, SF*, SF/2, and SF/2*, where SF has a frequency F; SF* has frequency F and is an inverse of SF; SF/2 has a frequency F/2, but is otherwise aligned with SF; and SF/2* is an inverse of SF/2. In the example, the SF has the same frequency as the PRSF signal. Encoding signals SF, SF*, SF/2, and SF/2* are selectively passed by MUX 156 under the control of the data input signal. Delay circuit 162 is not essential, but may be used to align SF with the other signals. Further, it is not essential that circuit 166 provide delay. To the extent delay is needed to align SF, SF*, SF/2 and SF/2* (as shown in FIG. 5), then the delay can be provided by circuits 162-168.

Various techniques can be used to control when MUX 156 selects one of the encoding signals. For example, the PRSF, the SF, or another signal could be used to control when MUX 156 passes one of the encoding signals.

Figures 5, 6:
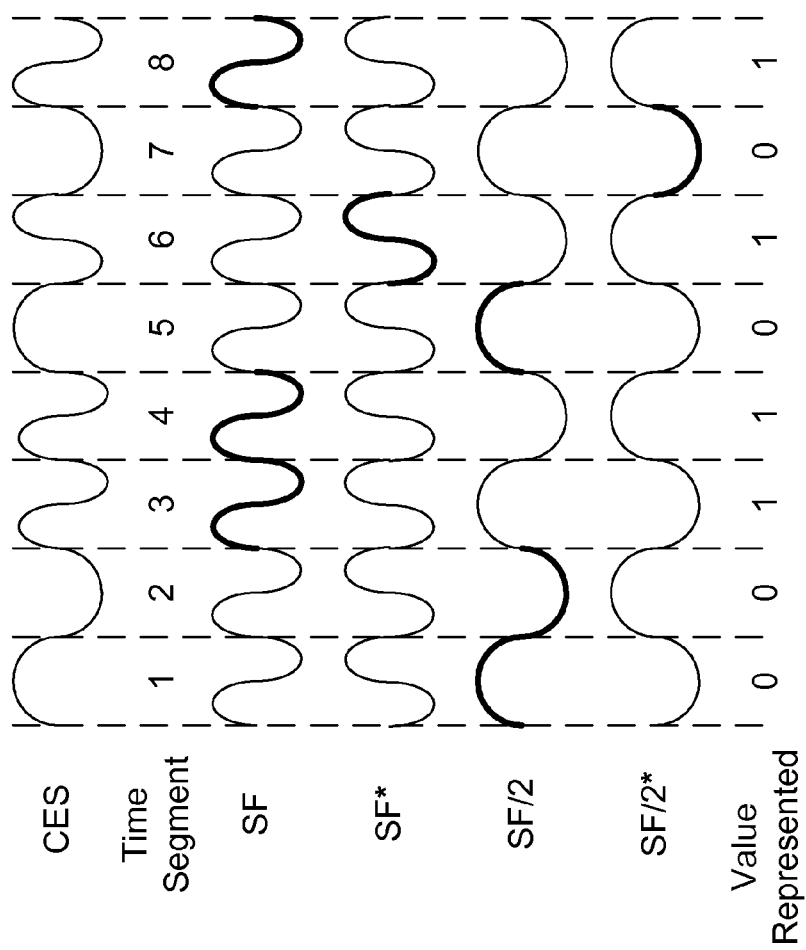
FIG. 5 is a timing diagram that shows signals according to some embodiments of the inventions.
FIG. 6 is a chart that shows signals according to some embodiments of the inventions.

FIG. 5 illustrates a timing diagram of the CES and encoding signals SF, SF*, SF/2, and SF/2* for data time segments 1-8 according to some embodiments. In the example of FIGS. 4-7, the data time segment is the period (cycle) of the PRSF from PLL 148. MUX 156 lets a different one of the SF, SF*, SF/2, and SF/2* signals through MUX 156 depending on the state of the data input signal and which signal was passed through MUX 156 in the previous data time segment. The signal passed by MUX 156 in each data time segment is shown in bold. For example, in data time segments 1 and 2, SF/2 is passed; in data time segments 3 and 4, SF is passed; in data time segment 5, SF/2 is passed; in data time segment 6, SF* is passed; in data time segment 7, SF/2* is passed; in data time segment 8, SF is passed.

The CES in FIG. 5 illustrates the meaning of the term "cycle" in a data time segment. For example, in data time segments 3, 4, 6, and 8, there is one cycle. In data time segments 1, 2, 5, and 7, there is a half cycle, which is less than one cycle. If the SF had twice the frequency shown in FIG. 5 and was passed by MUX 156, then there would be two cycles in a data time segment.

In the convention of FIG. 5, the CES is selected to be half the frequency of the PRSF when the data input signal is a logical 0 and the same frequency as the PRSF when the data input signal is a logical 1. Of course, the opposite convention could have been used.

As can be seen in FIG. 5, the CES of FIGS. 4 and 5 is a full CES in that each of encoding signals SF, SF*, SF/2, and SF/2* has a period that is equal to (SF and SF*) or greater than (SF/2 and SF/2*) the time of the data time segments. Accordingly, no data is represented by more than one cycle of an encoding signal. Of course, though imperfections in the circuits, a cycle could occasionally be slightly larger than a data time segment and the CES would still be a full CES.

FIG. 6 is a chart that illustrates the next signal that could be passed by MUX 156 in some embodiments. As can be seen in FIG. 6, the choice of encoding signal to be passed by MUX 156 is made so that there are not discontinuities in the signal. For example, if the previous signal was decreasing in voltage at the end of the previous data time segment, the chosen next signal decreases at the beginning of the next data time segment. If the previous signal was increasing in voltage at the end of the previous data time segment, the chosen next signal increases at the beginning of the next data time segment. Note that the place in an encoding signal where a cycle begins may be different than is shown in FIGS. 5 and 6.

As noted, the CES is made of continuous portions of the encoding signals SF, SF*, SF/2 and SF/2*. However, in practice they might not be perfectly continuous because of possible imperfections in MUX 156 or different delays in circuits 162-168.

Referring to FIG. 4, complementary cycle encoding circuit 154 provides a CCES which is driven by driver 124 to interconnect 24B and receiver 180. Complementary cycle encoding circuit 154 includes delay and invert circuit 172, delay circuit 174, delay, divide and invert circuit 176, and delay and divide circuit 178 to produce signals SF*, SF, SF/2*, and SF/2, respectively, which are the inverses of SF, SF*, SF/2, and SF/2* produced by cycle encoding circuit 152.

2. Receivers of FIGS. 4-7.

In FIG. 4, receiver 180 includes initial receiving circuit 182 and delay circuit 184, which are examples of initial receiving circuit 134 and delay circuit 138. Exclusive-OR (XOR) gate 190, flip-flops 196 and 198, AND gate 202, and NAND gate 204 are examples of logic circuit 142 in FIG. 3. Of course, the circuit in FIG. 3 is not limited to the details shown in FIG. 4. Initial receiving circuit 182 may be a comparator that compares the difference between the CES and CCES. The received signal (RS) output by initial receiving circuit 182 is approximately a square wave that changes from a high voltage (H) to a low voltage (L) or L to H when the voltages of CES and CCES cross.

Delay circuit 184 delays RS by about ¼ of a data time segment (¼ T delay signal) and by about ¾ of a data time segment (¾ T delay signal). Delay circuit 184 may be made of a delay chain or DLL. Delay circuit 184 may also provide a delay of one data time segment to provide a 1 T delay signal, but this is not required for all embodiments. The 1 T delay signal may be used in the optional additional circuit such as in FIG. 8.

The outputs of delay circuit 184 are provided to XOR gate 190. Table 1 below shows the truth table for XOR gate 190 and compares it to the value represented by CES and CCES. The input to XOR 190 is the same as the output of delay circuit 184. As can be seen, in this particular example, when the value represented by CES and CCES is 0, the output of XOR gate 190 is 0; and when the value represented by CES and CCES is 1, the output of XOR gate 190 is 1. This is arbitrary and the opposite voltages could correspond to 0 and 1. XOR 190 by CES and CCES

TABLE 1

| ¼ T Delay | ¾ T Delay | Output of XOR 190 | Value represented by CES and CCES |
|---|---|---|---|
| 0 | 0 | 0 | 0 |
| 0 | 1 | 1 | 1 |
| 1 | 0 | 1 | 1 |
| 1 | 1 | 0 | 0 |

Although the output of XOR 190 includes the correct data at data time segment t1, t2, t3, t4, t5, and t6, additional circuits (flip-flops 196 and 198, AND and NAND gates 202 and 204) are used provide a data out signal that includes the correct data between t1, t2, t3, t4, t5, t6, and t7. This can be seen in the following example of FIG. 7.

Figure 7:
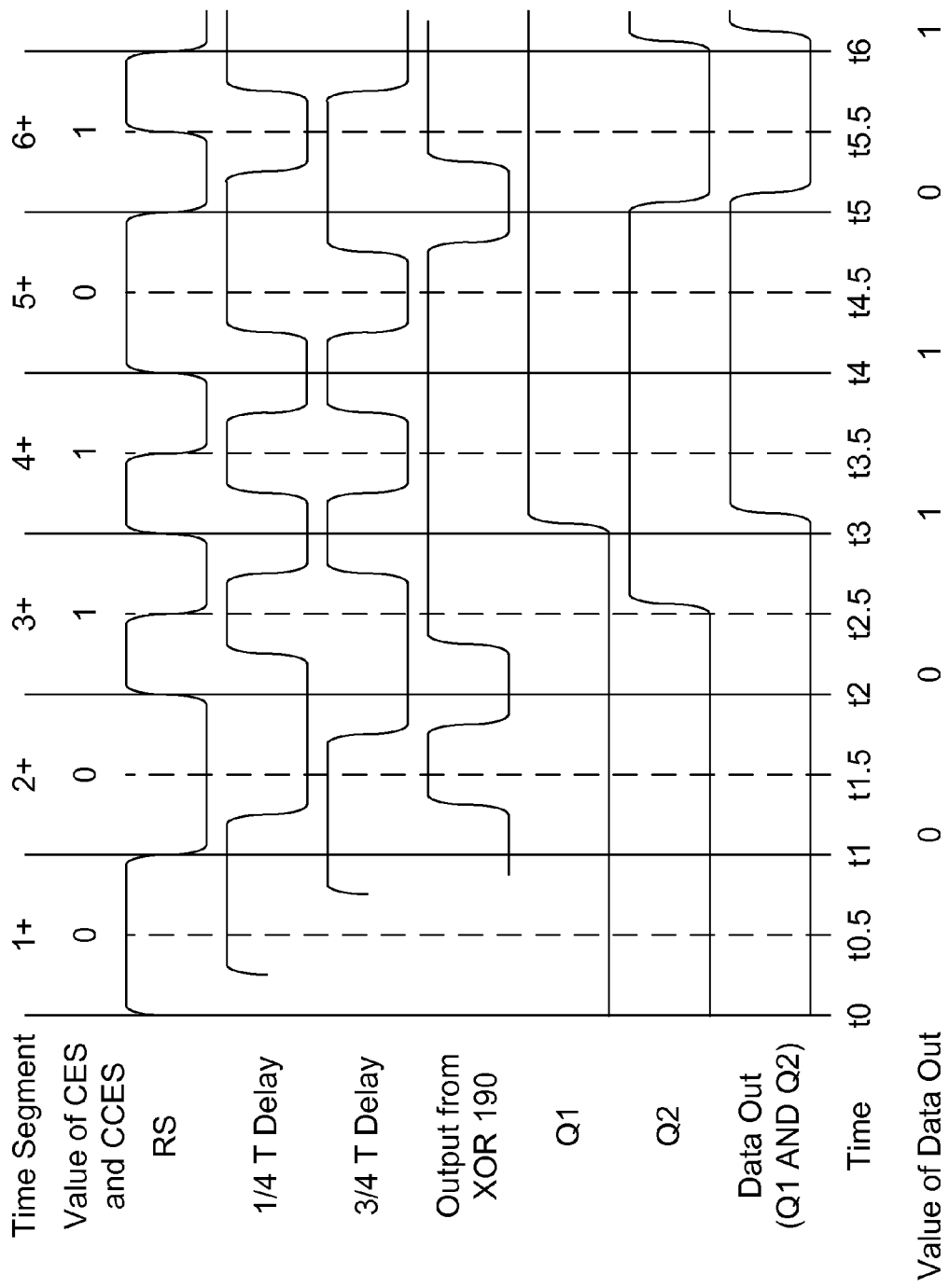
FIG. 7 is a timing diagram for the receiver of FIG. 4 that shows signals according to some embodiments of the inventions.

FIG. 7 shows an example of RS (output of initial receiving circuit 182), the ¼ T delay and ¾ T delay signals from delay circuit 184, the output of XOR gate 190, the Q1 and Q2 outputs of flip-flops 196 and 198, and the output of AND gate 202 for data time segments 1+, 2+, 3+, 4+, 5+, and 6+. Data time segments 1+-6+ correspond to data time segments 1-6 in FIG. 5 but are slightly delayed in time through driver 122, interconnect 24A, and initial receiving circuit 182. FIG. 7 follows the convention that a "0" represents a low voltage and a "1" represents a high voltage. The opposite convention could be used. Flip-flops 196 and 198 are in the reset condition (Q1 and Q2 are both 0) at time t0.

At time t1, when RS has a falling edge, the ¼ T delay and ¾ T delay are both 1 so XOR 190 outputs a 0. The falling edge of RS causes flip-flip 198 to output as Q2 what is at its D input, which is a 0. Q1 continues to be 0. Accordingly, the output of AND gate 202 is a 0.

At time t1.5, RS does not transition. Accordingly, Q1 and Q2 do not change and the data out signal does not change.

At time t2, when RS has a rising edge, the ¼ T delay and ¾ T delay are both 0 so XOR 190 outputs a 0. The rising edge of RS causes flip-flip 196 to output as Q1 what is at its D input, which is a 0. Q2 continues to be 0. Accordingly, the output of AND gate 202 is a 0.

At time t2.5, when RS has a falling edge, the ¼ T delay is 1 and the ¾ T delay is 0 so XOR 190 outputs a 1. The falling edge of RS causes flip-flip 198 to output as Q2 what is at its D input, which is a 1. Q1 continues to be 0. Accordingly, the output of AND gate 202 continues to be a 0 even though there was a transition of RS at time t2.5.

At time t3, when RS has a rising edge, the ¼ T delay is 0 and ¾ T delay is 1 so XOR 190 outputs a 1. The rising edge of RS causes flip-flip 196 to output as Q1 what is at its D input, which is a 1. Q2 continues to be 1. Accordingly, the Output Data from AND gate 202 changes to a 1 shortly following time t3. The amount of time between the transition in RS at t3 and the change of the Output Data depends on delays between flip-flops 196 and 198 and AND gate 202. Note that the signals of FIG. 7 are not necessarily to scale. Indeed, the delay between a change in the change in the RS signal and the change in data out signal may be somewhat smaller than is shown in FIG. 7.

At time t3.5, when RS has a falling edge, the ¼ T delay is 1 and the ¾ T delay is 0 so XOR 190 outputs a 1. The falling edge of RS causes flip-flip 198 to output as Q2 what is at its D input, which is a 1. Q1 continues to be 1. Accordingly, the output of AND gate 202 continues to be a 1 even though there was a transition of RS.

At time t4, when RS has a rising edge, the ¼ T delay is 0 and ¾ T delay is 1 so XOR 190 outputs a 1. The rising edge of RS causes flip-flip 196 to output as Q1 what is at its D input, which is a 1. Q2 continues to be 1. Accordingly, the output of AND gate 202 continues to be a 1.

At time t4.5, RS does not transition. Accordingly, Q1 and Q2 do not change and the data out signal does not change.

At time t5, when RS has a falling edge, the ¼ T delay is 1 and the ¾ T delay is 1 so XOR 190 outputs a 0. The falling edge of RS causes flip-flip 198 to output as Q2 what is at its D input, which is a 0. Q1 continues to be 1. Accordingly, the output of AND gate 202 changes to a 0.

At time t5.5, when RS has a rising edge, the ¼ T delay is 0 and ¾ T delay is 1 so XOR 190 outputs a 1. The rising edge of RS causes flip-flip 196 to output as Q1 what is at its D input, which is a 1. Q2 continues to be 0. Accordingly, the output of AND gate 202 continues to be a 0 even though there was a transition of RS.

At time t6, when RS has a falling edge, the ¼ T delay is 1 and the ¾ T delay is 0 so XOR 190 outputs a 1. The falling edge of RS causes flip-flip 198 to output as Q2 what is at its D input, which is a 1. Q1 continues to be 1. Accordingly, the output of AND gate 202 changes to a 1.

As can be seen, the value of the data out signal follows the value of the CES and CCES signals with a delay as described. As mentioned, with different logic the data out signal could have the opposite value. Further, the receiver could use the data out* signal (which is the inverse of the data out signal) in place of the data out signal, if desired.

In summary, for the receiver of FIG. 4, the output of initial receiving circuit 182 is delayed such that a sample is taken of the received signal in each of two halves of the data time segment. In the case of FIG. 4, the delays are by amounts of ¼ and ¾, but in other embodiments, delays by other amounts could be made. Further, in other embodiments, more than two delays may be made.

3. Synchronizing Circuits of FIGS. 8-9.

Figure 8:
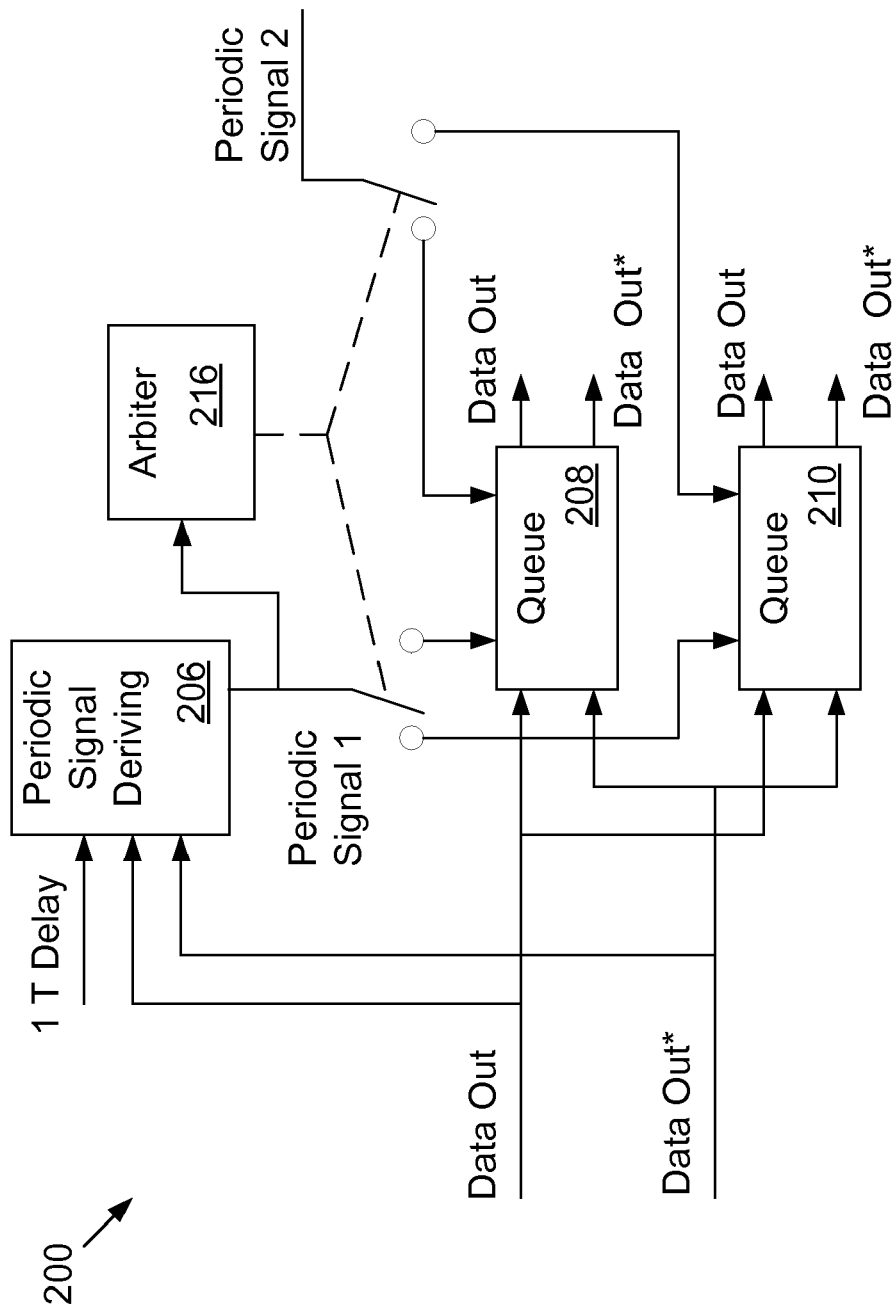
FIG. 8 is a block diagram representation of a synchronizing circuit that optionally may coupled to the receivers of FIGS. 4, 10, and 12 according to some embodiments of the inventions.

In some embodiments, additional circuitry is provided to synchronize the data out and data out* signals to a periodic signal (for example, a clock or strobe signal) for use in other parts of chip or portion of chip 16. For example, FIG. 8 illustrates a synchronizing circuit 200 which synchronizes the data out and data out* signals between a first periodic signal (periodic signal 1) derived indirectly from the CES and CCES and a second periodic signal (periodic signal 2) used by other portions of chip or portion of chip 16. Of course, the inventions are not limited to the details of FIG. 8. When synchronizing circuit 200 is used in connection with receiver 180, the data out and data out* signals are those from AND gates 202 and 204 and the 1 T delay signal is from delay circuit 184 of FIG. 4. A periodic signal deriving circuit 206 provides periodic signal 1 to a first queue (queue 208) or a second queue (queue 210).

Queue 208 and queue 210 work in tandem so that when queue 208 is taking in the data out and data out* signals, queue 210 is providing out previously taken in data out and data out* signals for use by other circuits (not shown). Likewise, when queue 210 is taking in the data out and data out* signals, queue 208 is providing out previously taken in data out and data out* signals. Periodic signal 1 is used to take in the data out and data out* signals into queue 208 or queue 210 (for example, from AND gates 202 and 204 in FIG. 4). Periodic signal 2 is used to provide out the previous stored data out and data out* signals from queue 208 or queue 210. Arbiter 216 determines whether periodic signals 1 and 2 are applied to queues 208 and 210, respectively, or to queues 210 and 208, respectively. There are various ways of implementing arbiter 216. One way is to include a counter that counts the number of cycles or half cycles of periodic signal 1 and switch between queues 208 and 210 after a certain number of cycles or half cycles are received.

The data out and data out* signals being output from queues 208 and 210 may be serial or parallel signals. That is, queues 208 and 210 may receive serial data out and data out* signals and provide serial data out and data out* signals. Alternatively, queues 208 and 210 may receive serial data out and data out* signals and convert them to parallel data out and data out* signals.

Periodic signal 1 may be an approximate square wave. Under one approach, the data out and data out* signals are inputted into queue 208 or 210 on both edges of periodic signal 1. Under another approach, the data out and data out* signals are inputted on only the rising edge or on only the falling edge of periodic signal 1. Under still another approach, periodic signal 1 is made of two sub-signals that are 180 degrees out of phase with each other. In this case, the data out and data out* signals could then be inputted on the rising edge of both sub-signals, the falling edge of both signals, or both rising and falling edges depending on the implementations. Under other implementations, the data out and data out* signals are inputted based on voltage levels rather than edges.

Periodic signal 2 may have the same frequency as periodic signal 1 or may have a different frequency (e.g., a multiple of periodic signal 1), depending on the implementation. However, in most cases, it is expected that periodic signals 1 and 2 would be out of phase with each other. As an example, periodic signal 2 may be a clock signal used in other parts of chip or portion of chip 16.

There are various ways in which periodic signal deriving circuit 206 can derive the periodic signal. In the illustrated embodiments of FIG. 8, periodic signal deriving circuit 206 uses the 1 T delay signal and the data out and data out* signals, but various other signals could be used.

Figure 9:
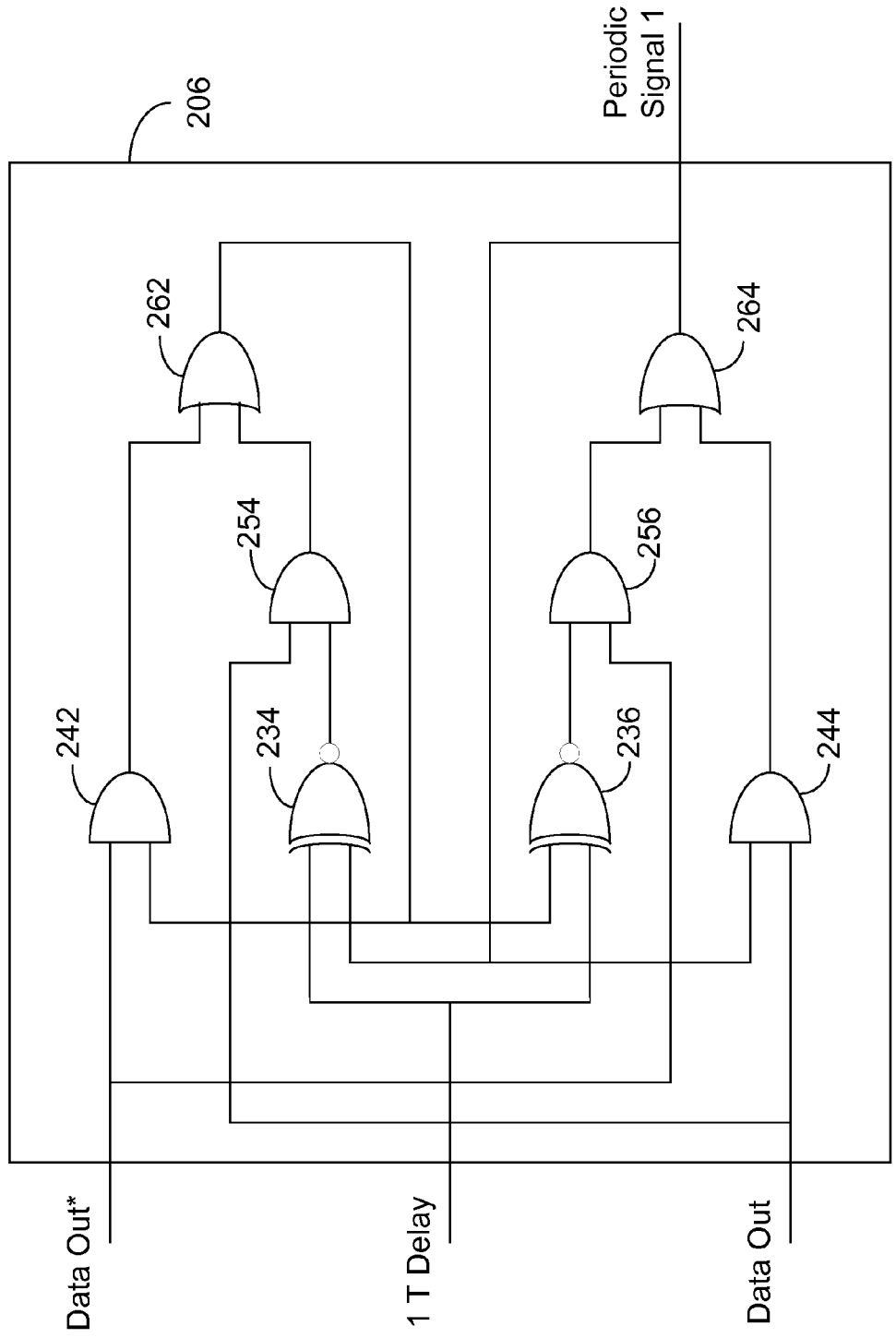
FIG. 9 is a block diagram representation of details of the periodic signal deriving circuit of FIG. 8 according to some embodiments of the inventions.

FIG. 9 illustrates one of the many possible implementations of periodic signal deriving circuit 206. In FIG. 9, an AND gate 242 receives the data out* signal and a signal fedback from OR gate 262. An AND gate 244 receives the data out signal and a signal fedback from OR gate 264. XOR gate 234 receives the 1 T delay signal and the signal fedback from OR gate 264. XOR gate 236 receives the 1 T delay signal and the signal fedback from OR gate 262. AND gate 254 receives the data out signal and the output of XOR gate 234. AND gate 256 receives the data out* signal and the output of XOR gate 236. OR gate 262 receives the outputs of AND gate 242 and 254. OR gate 264 receives the outputs of AND gate 244 and 256. OR gate 264 outputs the periodic signal 1.

D. Receivers of FIGS. 10-11

Figure 10:
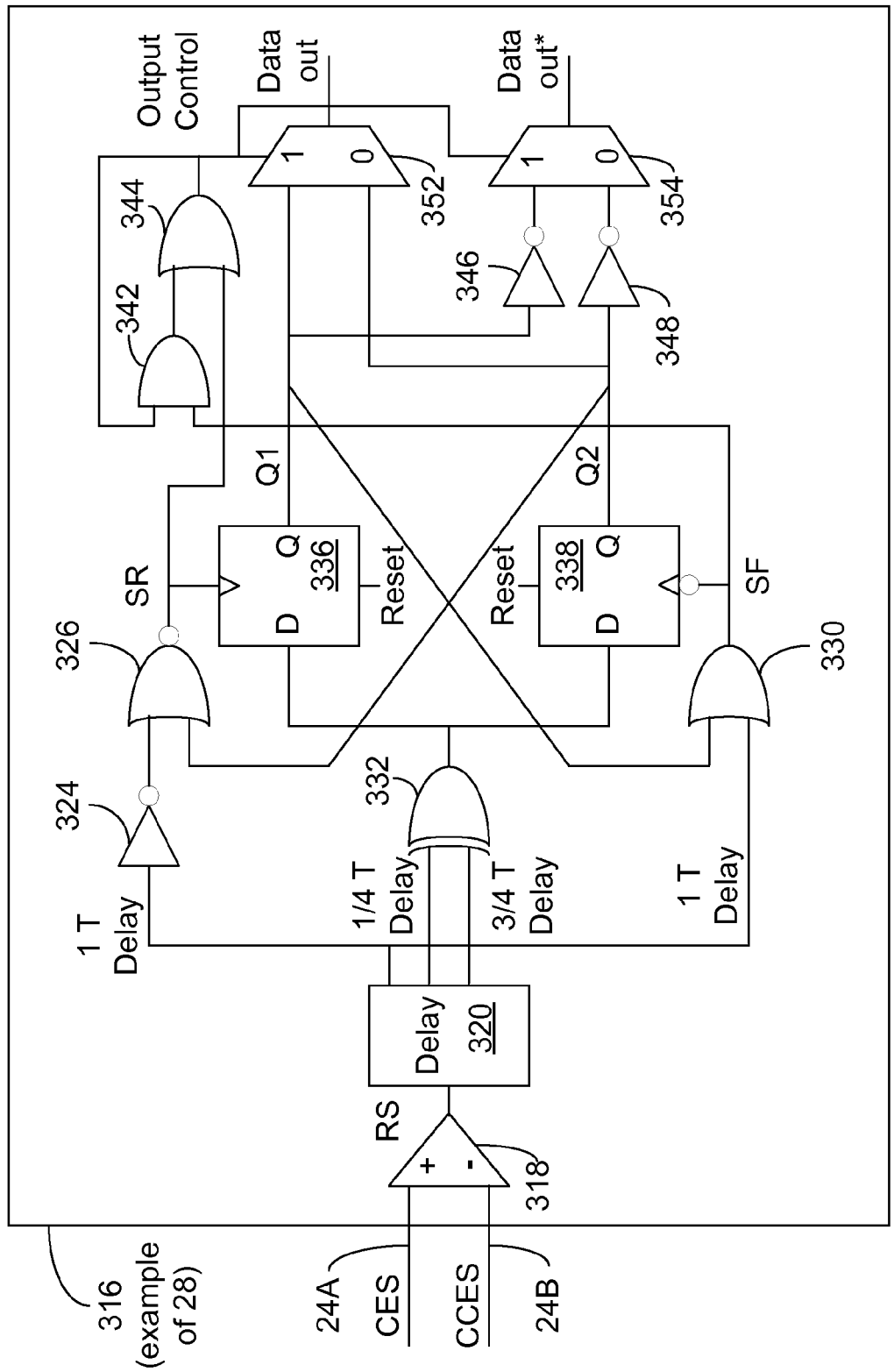
FIG. 10 is a block diagram representation including an example of the receiver of FIG. 3 according to some embodiments of the inventions.

FIG. 10 shows other embodiments of receivers 28 and 104. Referring to FIG. 10, initial receiving circuit 318 (which may be the same as circuit 182 in FIG. 4) receives CES and CCES and produces a received signal RS in response thereto. Delay circuit 320 provides a 1 T delay signal, a ¼ delay signal, and a ¾ delay signal. An XOR gate 332 provides a signal to flip-flops 336 and 338 in response to the ¼ and ¾ delay signals. A NOR gate 326 provides a signal rising (SR) signal in response to an output (Q2) of flip-flop 338 and an inverted 1 T delay signal through inverter 324. An OR gate 330 provides a signal falling (SF) signal in response to an output (Q1) of flip-flop 336 and the 1 T delay signal. A state machine in the form of an AND gate 342 and an OR gate 344 provides an output control signal. AND gate 342 receives the SF signal and the fedback output control signal. OR gate 344 provides the output control signal in response to the output of AND gate 342 and the SR signal. MUXs 352 and 354 are controlled by the output control signal. MUX 352 receives the Q1 and Q2 signals and provides the data out signal. MUX 352 receives inverted Q1 and Q2 signals (through inverters 346 and 348) and provides the data out* signal. In some embodiments, there is only MUX 352 or only MUX 354.

Figure 11:
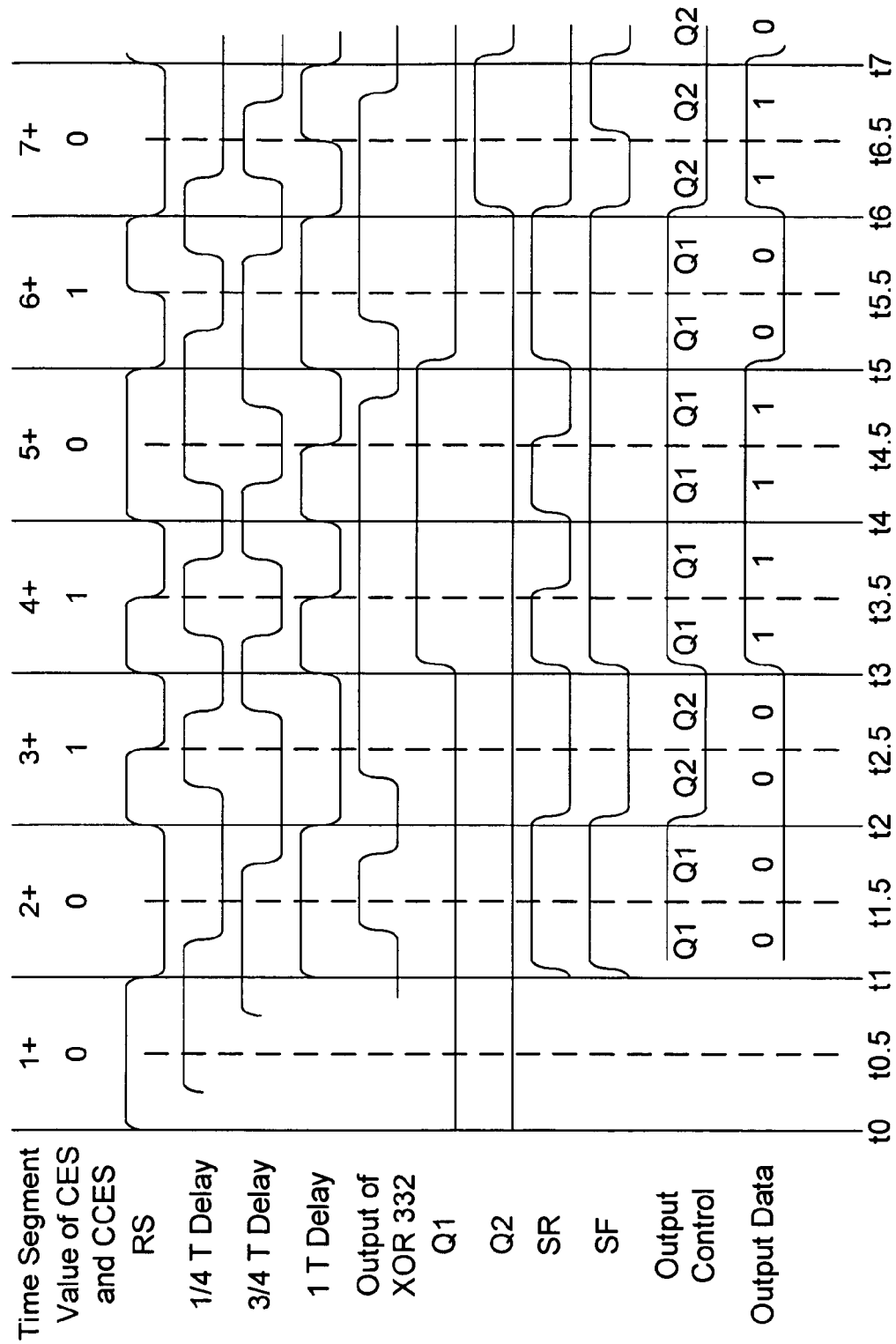
FIG. 11 is a timing diagram for the receiving of FIG. 10 that shows signals according to some embodiments of the inventions.

FIG. 11 is a timing diagram to illustrate the operation of the receiver of FIG. 10 for some embodiments. Other embodiments may have minor or significant deviations from that shown in FIGS. 10 and 11 and the follow description. At or before time t0, flip-flops 336 and 338 are reset so that Q1 and Q2 are 0 (low voltage). The values of SR and SF may be predefined for the time before t1 so there are known values for the data out and data out* signals.

At time t1, the 1 T delay signal is rising, and Q1 and Q2 are 0 so that SR and SF both rise. Accordingly, flip-flop 336 passes the 0 output of XOR 332 to Q1 and flip-flop 338 does not clock. Hence, Q1 and Q2 remain 0. With SR being 1, the output control signal from OR gate 344 is 1. With SF 1, the output of AND gate 342 is 1. With the output control signal being 1, MUXs 352 and 354 pass Q1 and Q1*, respectively.

At time t1.5, the 1 T delay signal does not transition, so there is not change in SF, SR, Q1, Q2, or the output control signal.

At time t2, the 1 T delay signal is falling, and Q1 and Q2 are 0 so that SR and SF both fall. Accordingly, flip-flop 338 clocks the 0 output by XOR 332 to Q2 and flip-flop 336 does not clock. Hence, Q1 and Q2 remain 0. With SF being 0, the output of AND gate 342 is 0. Further, since SR is 0, the output of OR gate 344 (output control signal) is 0. With the output control signal being 0, MUXs 352 and 354 pass Q2 and Q2*, respectively.

At time t2.5, the 1 T delay signal does not transition, so there is not change in SF, SR, Q1, Q2, or the output control signal.

At time t3, the 1 T delay signal is rising, and Q1 and Q2 are 0 so that SR and SF both rise. Accordingly, flip-flop 336 clocks the 1 output by XOR 332 to Q1 and flip-flop 338 does not clock. Hence, Q1 changes to 1 and Q2 remains 0. With SR being 1, the output control signal from OR gate 344 is 1. With SF 1, the output of AND gate 342 is 1. With the output control signal being 1, MUXs 352 and 354 pass Q1 and Q1*, respectively.

At time t3.5, the 1 T delay signal is falling and Q2 is 0 so SR falls. However, Q1 is 1 which forces SF to remain 1 even though the 1 T delay signal is falling. According, neither flip-flop 336 or 338 clocks data and Q1 remains 1 and Q2 remains 0. As such, receiver 316 keeps the output control signal or data from changing during mid-segment transitions by blocking OR gate 330 from changing SF when Q1 is 1 and the 1 T delay signal falls (as in the case of t3.5 and t4.5) or by blocking NOR gate 326 from changing SR when Q2 is 1 and the 1 T delay signal rises (as in the case of t6.5). With SF being 1, the output control signal stays 1 and MUXs 352 and 354 continue to pass Q1 and Q1*, respectively. The output of AND gate 342 stays high.

At time t4, the 1 T delay signal is rising and Q2 is 0 so SR rises and flip-flop 336 clocks the 1 output by XOR 332 to Q1. Q1 is 1 which forces SF to remain 1. However, with 1 T delay rising, SF would be a 1 even if Q1 were 0. Since SF remains 1, flip-flop 338 does not clock. With SR being 1, the output control signal stays 1 and MUXs 352 and 354 continue to pass Q1 and Q1*, respectively. The output of AND gate 342 stays high.

At and following time t4.5, the signals are the same as at and following time t3.5.

At time t5, the 1 T delay signal is rising and Q2 is 0 so that SR rises. Accordingly, flip-flop 336 passes the 0 output of XOR 332 to Q1. With the 1 T delay signal rising, SF remains 1 and Q2 remains 0. With SR being 1, the output control signal from OR gate 344 is 1 and MUXs 352 and 354 pass Q1 and Q1*, respectively. The output of AND gate 342 stays high.

At time t5.5, the 1 T delay signal does not transition, so there is not change in SF, SR, Q1, Q2, or the output control signal.

At time t6, the 1 T delay signal is falling, and Q1 and Q2 are 0 so that SR and SF both fall. Accordingly, flip-flop 338 clocks the 1 output by XOR 332 to Q2 and flip-flop 336 does not clock. Hence, Q2 changes to 1 and Q1 remains 0. With SF being 0, the output of AND gate 342 is 0. Further, since SR is 0, the output of OR gate 344 (output control signal) is 0. With the output control signal being 0, MUXs 352 and 354 pass Q2 and Q2*, respectively.

At time t6.5, the 1 T delay signal is rising and Q2 is 1 so that SR stays 0. As mentioned, this blocks flip-flop 336 from clocking. Since Q1 is 0 and the 1 T delay signal is 1, SF changes to 1 and flip-flop 338 does not clock. Therefore, Q1 and Q2 remain 0 and 1, respectively. Since the output control signal was 0 and SR is 0, the output control signal remains 0 even though SF is 1. Accordingly, MUXs 352 and 354 continue to pass Q2 and Q2*, respectively.

At time t7, the 1 T delay signal is falling and Q1 is 0 so SF is falling. SR is also 0. Accordingly, flip-flop 338 clocks the 0 output by XOR 332 to Q2 and flip-flop 336 does not clock. Hence, Q2 changes to 0 and Q1 remains 0. With SF being 0, the output of AND gate 342 is 0. Further, since SR is 0, the output control signal is 0. With the output control signal being 0, MUXs 352 and 354 pass Q2 and Q2*, respectively.

The values of the data out signal are shown adjacent to the output control signal in FIG. 11. As can be seen, the output control signal has the same value as the CES and CCES with a delay of slightly more than 1 data time segment. Of course, different logic could be used so that the data out signal has the opposite value as the CES and CCES.

In summary, the output control signal selects Q1 in response to SR rising shortly after the beginning of data time segment and selects Q2 in response to SF falling shortly after the beginning of data time segments. Receiver 316 blocks the effect of mid-segment transitions of CES and CCES that otherwise would change the selection between Q1 and Q2 or the output control signal.

Synchronizing circuit 200 in FIG. 8 may be used in connection with receiver 316.

E. Additional Embodiments and Information

Figure 12:
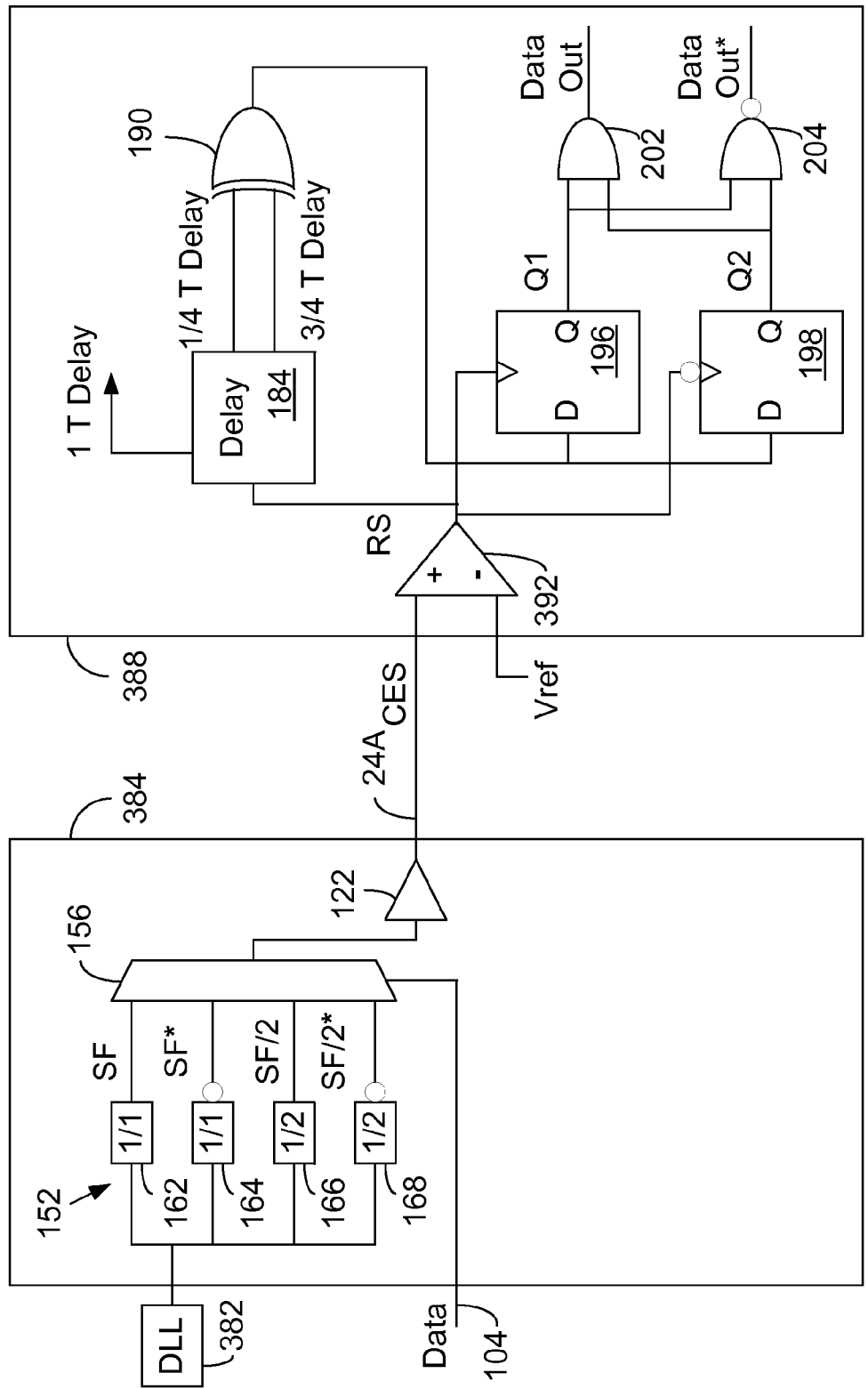
FIG. 12 is a block diagram representation of a system according to some embodiments of the inventions.

The inventions are not limited to use with complementary signals CES and CCES. For example, FIG. 12 shows a transmitter 384 (which is an example of transmitter 20 of FIG. 1) with cycle encoding circuit 152, but not complementary cycle encoding circuit 154 so that the CES but not the CCES is produced. Receiver 388 (which is an example of receiver 28 in FIG. 1) includes an initial receiving circuit 392, which may be a comparator, and which compares the CES to a reference signal Vref As an example, Vref might be between a high and low voltage for the CES. To show different possibilities, in FIG. 12, a DLL 382 provides a periodic reference signal rather than a PLL as in FIG. 4.

Figure 13:
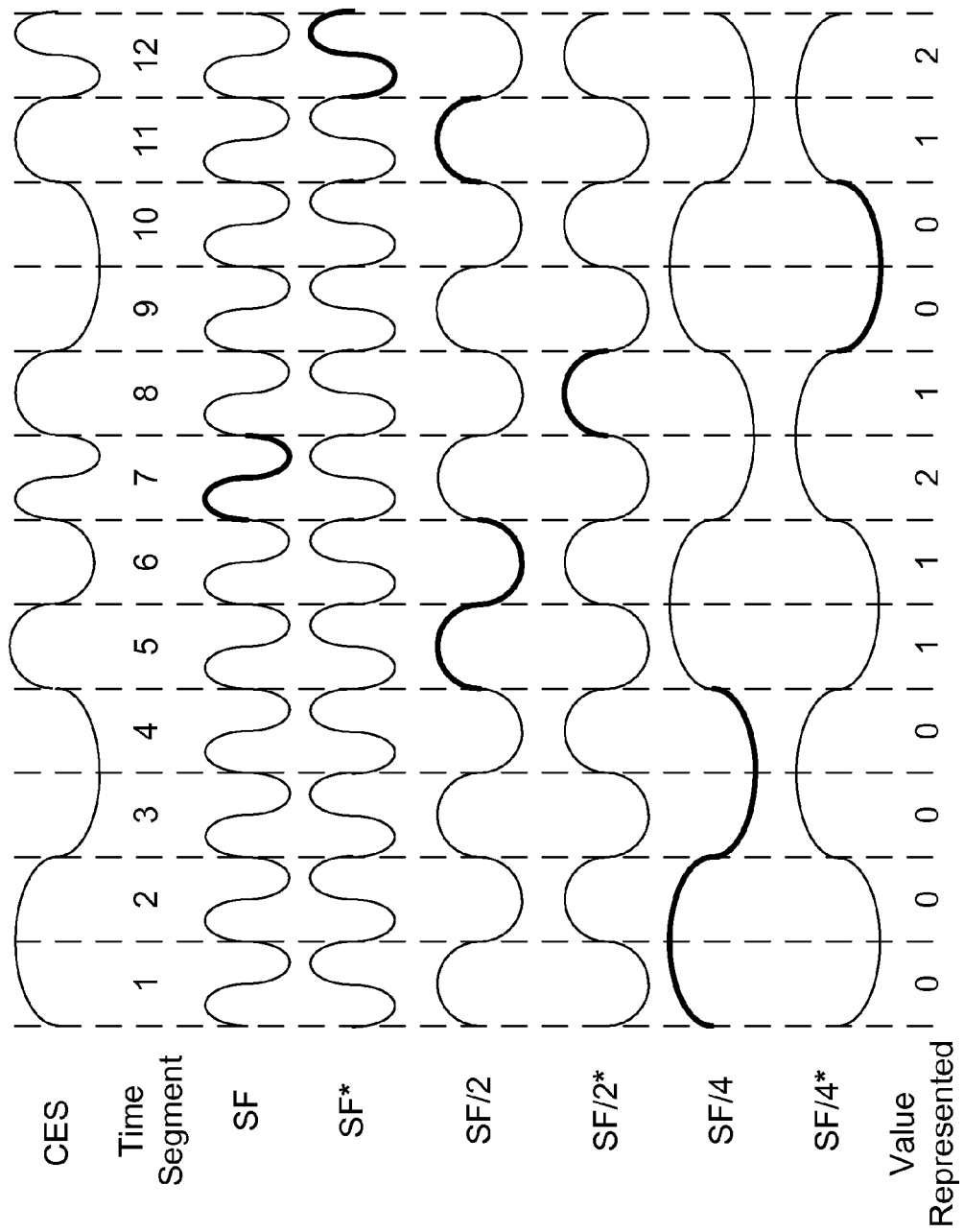
FIG. 13 is a timing diagram that shows signals according to some embodiments of the inventions.

The inventions are not limited to use with only a 0 or 1 being represented. For example, FIG. 13 illustrates a CES that can represent 0, 1, or 2. The choice of which encoding signal SF, SF*, SF/2, SF/2*, SF/4, and SF/4* that represents 0, 1, and 2 is arbitrary. The signals of FIG. 13 can be created by adding additional circuits to those of circuits 162-168 and 172-178. A receiver could take samples at additional locations through for example, additional delays. Also, the logic would be more complicated logic than shown in FIG. 4 or 10. More circuits could be added to provide SF/8 and SF/8* to represent 0, 1, 2, and 3. The encoding signals do not have to be at divisions of two of the maximum frequency. For example, in some embodiments, the encoding signals might include those with ⅔ or ¾ of the maximum frequency.

Another way to encode additional represented values (e.g., 0, 1, 2, 3) is to have additional voltage levels, rather than merely high or low. For example, the signals of FIGS. 5 and 13 could have additional voltage levels.

A partial CES includes some encoding signals with a period that is less than (for example, half) the data time segment while other encoding signals have a period that is equal to or greater than the data time segment. One way to accomplish this is to have the frequency of the PRSF of FIG. 4 be twice the frequency it is in FIG. 4 and to reduce the frequency of it in creating only some encoding signals. The circuits of an accompanying receiver would be such as to recover the input data from a CES and CCES with these frequencies.

In the CES's described in connection with FIGS. 4, 5, 7, 10, 11, 12, and 13, there is only one encoding signal per data time segment. In other embodiments, one encoding signal may be used in part of a data time segment, while another encoding signal may be used in the remainder of the data time segment. Having more than one encoding signal in a data time segment can be used to represent merely a 0 or 1 or to represent more than two values.

In the CES's described in connection with FIGS. 4, 5, 7, 10, 11, 12, and 13, the data time segment is constant. In other embodiments, the data time segment could have a variable width. Merely a 0 or 1 or more values could be thereby represented.

Figure 14:
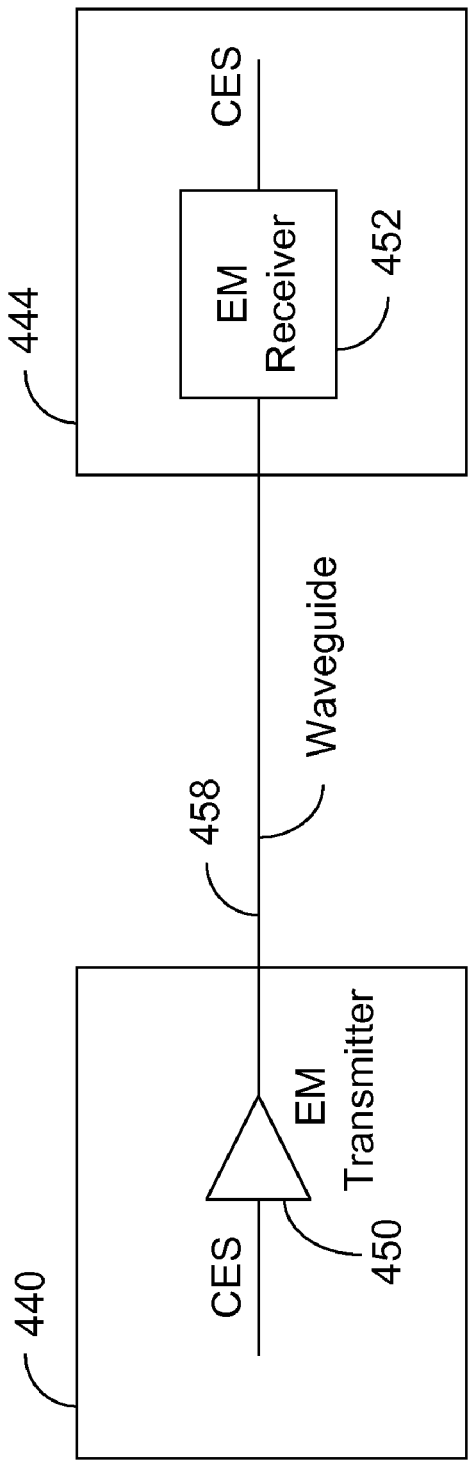
FIGS. 14 and 15 are each a block diagram representation of a system according to some embodiments of the inventions.

The inventions are not limited to a particular type of interconnect between the transmitter and receiver. For example, the illustrated versions of the transmitters and receivers show the interconnects as being electrical conductors that carry conventional electrical signals. However, various other types of interconnects could be used including electromagnetic interconnects (for example, wave guides (including fiber optics) and radio-frequency (RF)). Merely as an example, FIG. 14 illustrates an electromagnetic (EM) transmitter 450 in a transmitter 440 that provides an EM signal on a wave guide 458 to EM receiver 452 in a receiver 444. As shown in FIG. 14, the CES is transmitted over the wave guide. There could also be such a EM transmitter and receiver coupled through a wave guide for the CCES.

Figure 15:

FIG. 15 illustrates a system similar to that of FIG. 14 except that EM transmitter 476 in transmitter 470 is a wireless transmitter and EM receiver 478 in receiver 474 is a wireless receiver. As an example, the EM signal may be a radio frequency (RF) signal or another type of EM signal. As an example, transmitter 476 and receiver 478 may include λ/4 antennas.

Conductors 24A and 24B are not necessarily continuous but could include intermediate circuits, vias etc. The conductors may include capacitors for serial AC coupling although that may slow the switching speed. The inventions may be used in point-to-point interconnect systems as shown in FIGS. 1 and 2 in which there is one receiver for each transmitter. The inventions could also be used in a system in which a signal is transmitted from one transmitter to multiple receivers. The illustrated circuits may include additional circuits such as electro-static discharge (ESD) circuits, enable signal control circuits, and timing chains. In alternative embodiments, the CES could be carried differentially on two conductors and CCES could be carried differentially on two conductors. Edge triggered circuits may be replaced with level triggered circuits. Voltage controlled or current controlled circuits could be used.

The term "responsive" means that one thing or event at least partially causes another thing or event, although there may be other causes for the thing or event. Two circuits may be coupled directly or coupled indirectly through an intermediate circuit.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a chip, feature, structure, or characteristic "may", "might", or "could" be included, that particular chip, feature, structure, or characteristic is not required to be included. If the specification or claim refers to "a" or "an" element, that does not mean there is only one of the element. If the specification or claims refer to "an additional" element, that does not preclude there being more than one of the additional element.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A chip comprising:
a receiver to receive a full cycle encoded signal in which data is represented in data time segments, wherein each data time segment represents a cycle and no data time segment has more than one cycle, and provide a data output signal responsive to the full cycle encoded signal, wherein the receiver comprises an initial receiving circuit to receive the full cycle encoded signal and provide a received signal in response thereto, a delay circuit and a logic circuit to provide another data output signal which recovers data from another cycle encoded signal.

2. The chip of claim 1, wherein within some of the data time segments at least one cycle of the full cycle encoded signal is an inverse of other cycles of the full cycle encoded signal within others of the data time segments, and wherein within some of the data time segments at least one cycle of the full cycle encoded signal constitutes one cycle and within others of the data time segments at least one cycle of the full cycle encoded signal constitutes a half cycle.

3. The chip of claim 1, wherein the receiver further receives complementary full cycle encoded signal and wherein the receiver provides the data output signal responsive to the full cycle encoded signal and the complementary full cycle encoded signal.

4. The chip of claim 3, wherein the receiver comprises the initial receiving circuit to compare the full cycle encoded signal and the complementary full cycle encoded signal to provide a received signal in response thereto, the delay circuit to provide at least two delayed signals which are delayed versions of the received signal, and the logic circuit to provide the data output signal.

5. The chip of claim 4, wherein the logic circuit also provides an inverse data output signal.

6. The chip of claim 4, wherein the logic circuit responds to changes the received signal at the beginning of a data time segment, but not to mid-data time segment changes in the received signal.

7. The chip of claim 4, wherein the at least two delayed signals include a ¼ data time segment delay signal and a ¾ data time segment delay signal.

8. The chip of claim 4, wherein the logic circuit includes an exclusive-OR gate to receive the at least two delayed signals and first and second flip-flips to receive an output of the exclusive-OR gate and to receive the received signal at clock inputs of the first and second flip-flops, wherein the first flip-flop is clocked on a rising edge and the second flip-flop is clocked on a falling edge.

9. A chip comprising:
a receiver to receive a cycle encoded signal in which data is represented in data time segments, wherein each data time segment represents a cycle and at least some data time segments do not have more than one cycle, and to provide a data output signal responsive to the cycle encoded signal,
wherein the receiver comprises an initial receiving circuit to receive the cycle encoded signal and provide a received signal in response thereto, a delay circuit and a logic circuit to provide another data output signal which recovers data from another cycle encoded signal.

10. The chip of claim 9, wherein the cycle encoded signal is a full cycle encoded signal in which no data time segment has more than one cycle of an encoding signal.

11. The chip of claim 10, wherein within some of the data time segments at least one cycle of the full cycle encoded signal is an inverse of other cycles of the full cycle encoded signal within others of the data time segments, and wherein within some of the data time segments at least one cycle of the full cycle encoded signal constitutes one cycle and within others of the data time segments at least one cycle of the full cycle encoded signal constitutes a half cycle.

12. The chip of claim 9, wherein the logic circuit also provides an inverse of the data output signal.

13. The chip of claim 9, wherein the logic circuit responds to changes the received signal at the beginning of a data time segment, but not to mid-data time segment changes in the received signal.

14. A system comprising:
a transmitter including:
(a) a cycle encoding circuit to receive a data input signal and to provide a full cycle encoded signal in response thereto by continuously joining portions of different encoding signals, wherein some of the encoding signals have a different frequency than others of the encoding signals and some of the encoding signals have a different phase than others of the encoding signals; and
(b) a complementary cycle encoding circuit to receive the data input signal and to provide a complementary full cycle encoded signal in response thereto by continuously joining portions of the different encoding signals; and
a receiver to receive the cycle encoded signal and the complementary cycle encoded signal and to recover values of the data input signal in response thereto, wherein the receiver includes an initial receiving circuit to compare the full cycle encoded signal and the complementary full cycle encoded signal to provide a received signal in response thereto, a delay circuit to provide at least two delayed signals which are delayed versions of the received signal, and a logic circuit to provide the data output signal which represents the recovered values,
wherein the initial receiving circuit to receive the full cycle encoded signal and provide the received signal in response thereto, the delay circuit and the logic circuit to provide another data output signal which recovers data from the complementary full cycle encoded signal.

15. The system of claim 14, wherein the encoding signals include a first encoding signal with frequency F, a second encoding signal that is an inverse of the first encoding signal, a third encoding signal that has a frequency F/2, and a fourth encoding signal that is an inverse of the third encoding signal.

16. The system of claim 14, wherein the full cycle encoded signal in which no data time segment has more than one cycle of an encoding signal.

17. The system of claim 14, wherein the logic circuit responds to changes of the received signal at the beginning of a data time segment, but not to a mid-data time segment changes in the received signal.

18. The system of claim 14, wherein the logic circuit includes an exclusive-OR gate to receive the at least two delayed signals and first and second flip-flips to receive an output of the exclusive-OR gate and to receive the received signal at clock inputs of the first and second flip-flops, wherein the first flip-flop is clocked on a rising edge and the second flip-flop is clocked on a falling edge.

19. The system of claim 14, further comprising a synchronizing circuit to synchronize the data output signal to a second periodic signal and wherein the synchronizing circuit includes a periodic signal deriving circuit to provide a first periodic signal in response to the full cycle encoded signal and wherein the first periodic signal is used in synchronizing.

* * * * *